Jan. 13, 1953
C. W. RICKEL ET AL
2,625,427
SERVICE TRUCK
Filed Nov. 15, 1948
4 Sheets-Sheet 1
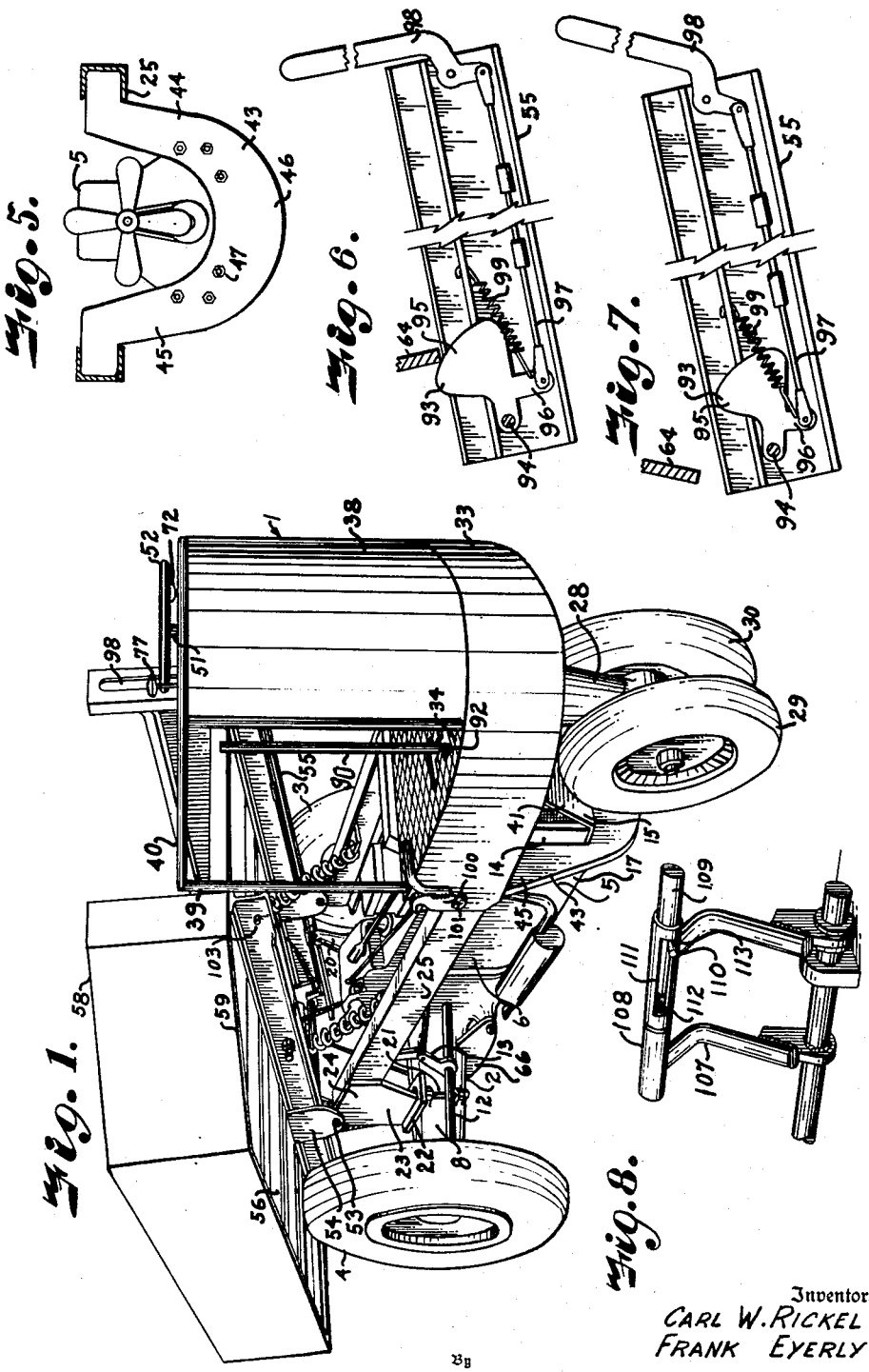
Inventors
CARL W. RICKEL +
FRANK EYERLY
By Fishburn & Mullendore
Attorneys Jan. 13, 1953 C. W. RICKEL ET AL 2,625,427
SERVICE TRUCK
Filed Nov. 15, 1948 4 Sheets-Sheet 2
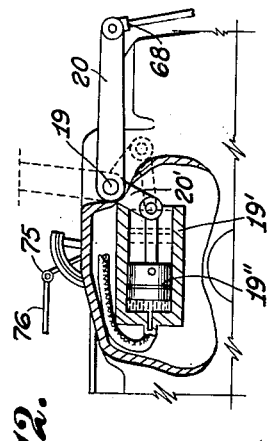
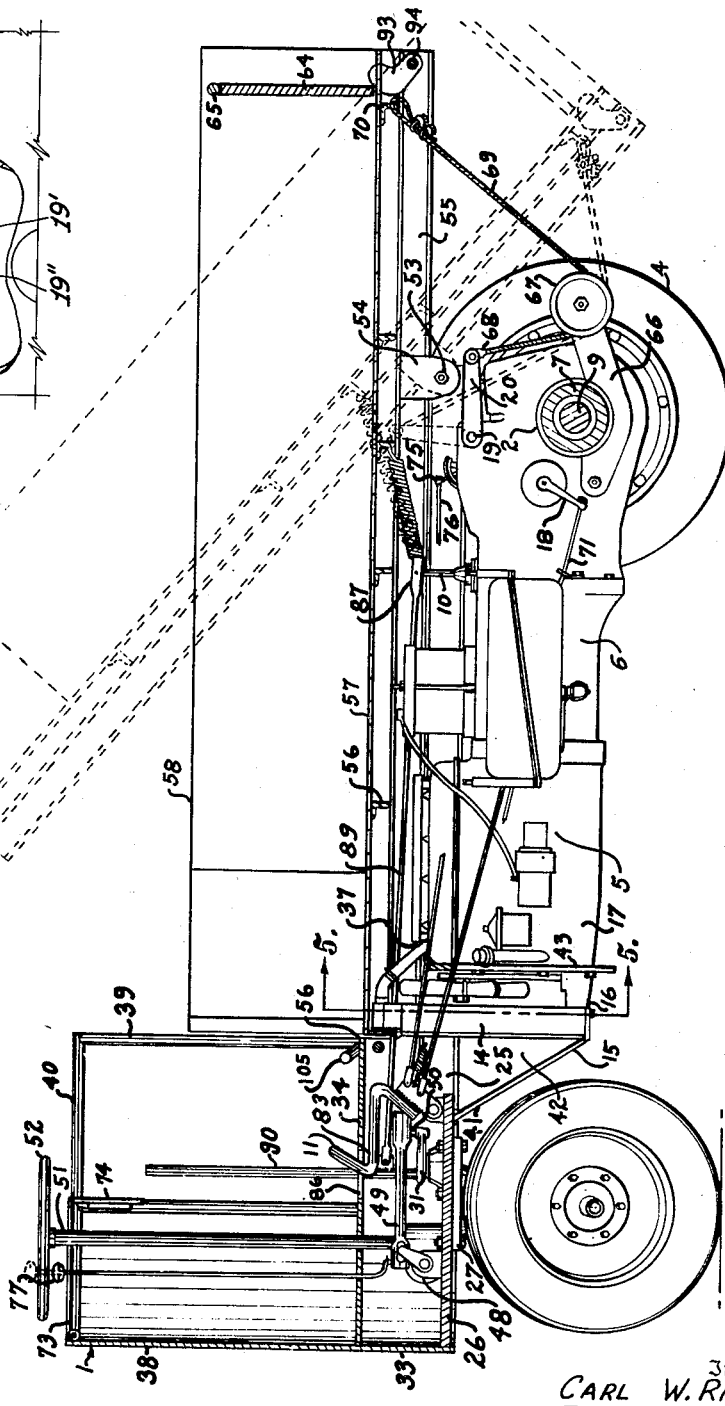
Inventors
CARL W. RICKEL
FRANK EYERLY
By
Fishburn + Mullendore
Attorneys Jan. 13, 1953
C. W. RICKEL ET AL
2,625,427
SERVICE TRUCK
Filed Nov. 15, 1948
4 Sheets-Sheet 3
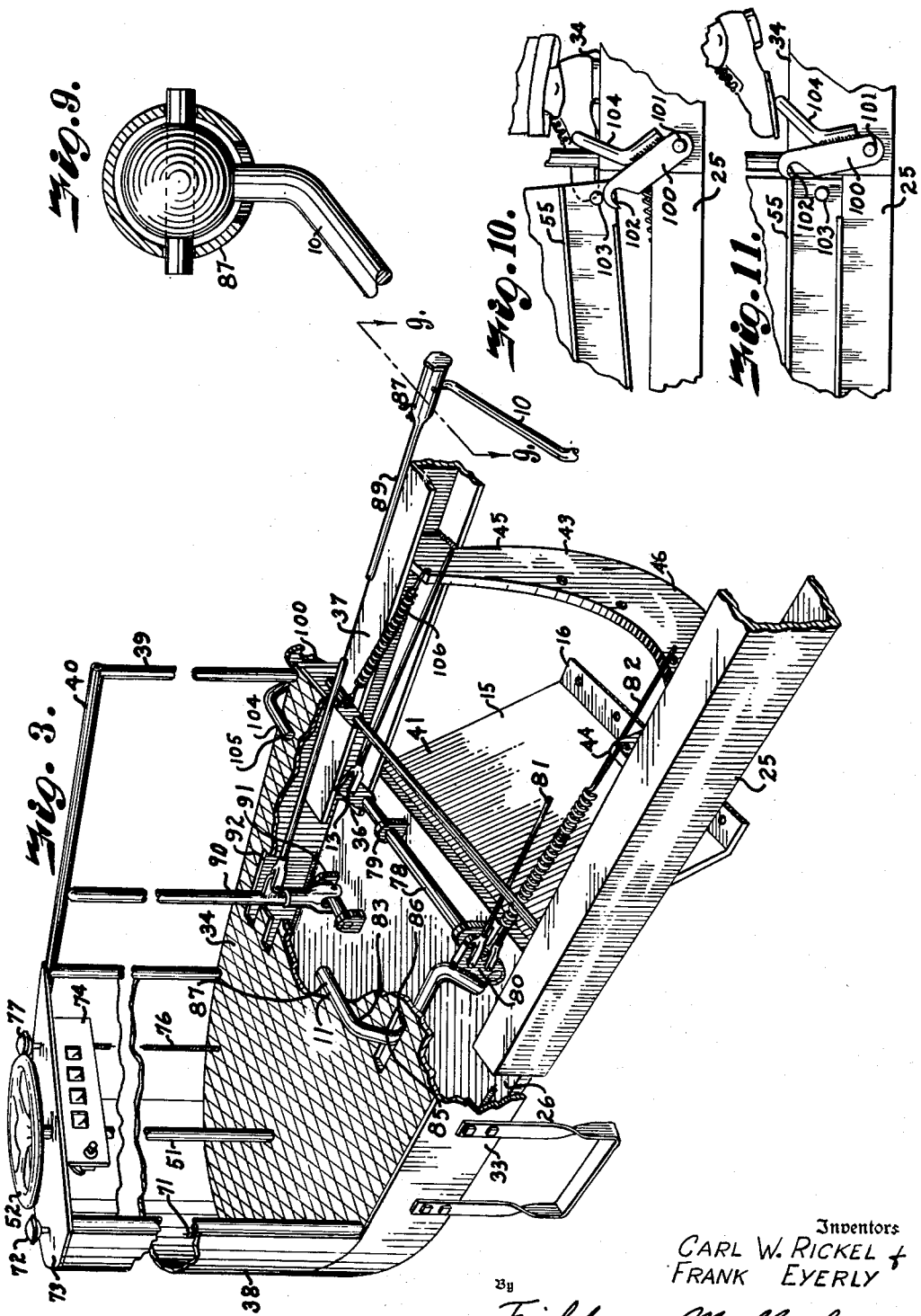
Inventors
CARL W. RICKEL &
FRANK EYERLY
By Fishburn & Mullendore
Attorneys

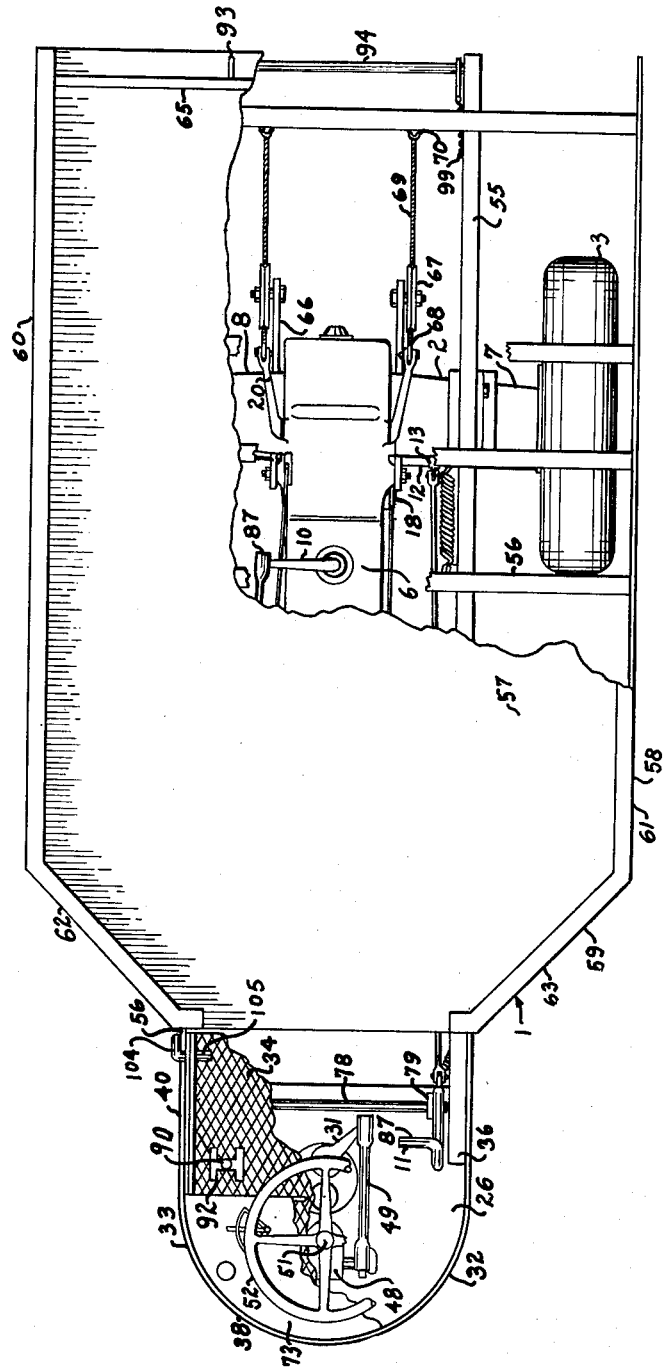

Patented Jan. 13, 1953

2,625,427

UNITED STATES PATENT OFFICE 2,625,427

SERVICE TRUCK

Carl W. Rickel and Frank Eyerly, Basehor, Kans., assignors to William C. Rickel, Basehor, Kans.

Application November 15, 1948, Serial No. 60,002

6 Claims. (Cl. 298—22)

This invention relates to a service truck equipped with a dump bed and has for its principal object to provide a motorized truck of this type that is characterized by ease of maneuverability whereby it is adapted for use in confined quarters, for example, in narrow alleys and connecting pens of a stock yards to haul hay, feed and otherwise service the pens in which animals are retained.

Other objects of the invention are to provide a strong, rigid service truck capable of hauling heavy loads with a minimum operating and upkeep cost; to provide a service truck structure adapted for the limited speeds necessitated by the close quarters in which such trucks operate; to provide an operator's station and controls which promote safety and ease of manipulation; to provide a service truck structure which utilizes a conventional farm tractor power unit as the motive power and carrier for the dump bed; to provide a dump bed and mounting thereof which permits use of the hydraulic mechanism of the tractor unit in furnishing power for dumping a load; to provide for gravity return of the dump bed; and to provide a safety latch mechanism for securing the bed in hauling position.

In accomplishing these and other objects of the invention hereinafter pointed out, we have provided improved structure, the preferred form of which is illustrated in the accompanying drawings wherein:

Fig. 1 is a perspective view of a service truck constructed in accordance with the present invention and showing the bed in dumping position.

Fig. 2 is a longitudinal section through the service truck with the bed in hauling position and showing dumping position of the bed in dotted lines.

Fig. 3 is a fragmentary perspective view of the front portion of the truck, particularly illustrating the operator's station and controls, with parts broken away to better illustrate the connectors for the controls.

Fig. 4 is a plan view of the service truck with parts broken away to better illustrate the structure.

Fig. 5 is a transverse section on the line 5—5 of Fig. 2, particularly illustrating the forward mounting of the dump body supporting sills.

Fig. 6 is a detail view illustrating the endgate latch mechanism for the dump body and showing the endgate in latched position.

Fig. 7 is a similar view but showing the endgate unlatched for dumping a load.

Fig. 8 is a detail perspective view illustrating a modified form of clutch and brake control.

Fig. 9 is a detail section on the line 9—9 of Fig. 3.

Fig. 10 is a fragmentary view illustrating a safety function of dump body latch whereby the latch stops return movement of the dump body in case the operator's foot is not engaged with the latch.

Fig. 11 is a similar view showing the operator's foot in position for manipulating the latch to permit engagement with the dump body.

Fig. 12 is a fragmentary view of the tractor showing the casing broken away to better illustrate the hydraulic mechanism for actuating the dump body, the hydraulic cylinder being shown in section.

Referring more in detail to the drawings:

1 designates a service truck constructed in accordance with the present invention and which includes a motor, transmission and rear axle assembly 2, together with the rear wheels 3 and 4 of a conventional farm tractor since the strength of construction, operating speeds and power mechanism thereof are found highly adaptable in filling the requirements of a service truck. Such a tractor includes a motor 5 and transmission 6 rigidly connected together and having rear axle housings 7 and 8 extending laterally of the transmission section for enclosing the axle shafts 9 for driving the rear wheels 3 and 4 at speeds provided by the transmission and selected through a gear shaft lever 10.

The tractor also includes a suitable clutch (not shown) operably connecting the motor with the transmission and adapted to be actuated by a lever 11. The tractor also includes brake shafts 12 supported in substantially parallel relation with the axle housings on the respective sides of the transmission and carrying levers 13 by which the shafts are rocked to set brakes (not shown) on the rear wheels 3 and 4. The tractor unit further also includes a radiator assembly 14 carried on a frame 15 rigidly projecting from the front face 16 of the motor block 17. The tractor is also provided with a hydraulic fluid pump (not shown) driven from the transmission and operated through a clutch lever 18 for supplying hydraulic fluid to a hydraulic cylinder mechanism 19' that is but contained in the transmission housing this mechanism includes a piston 19' which is connected with an arm 20' on a transverse shaft 19 carrying spaced lever arms 20 that project rearwardly over the axle housings as best shown in Figs. 2 and 4.

Mounted on each rear axle housing by bolts 21 are horizontal plates 22 carrying vertical plates 23 forming brackets 24. Connected to the respective brackets 24 are channel-shaped sills 25 extending alongside the upper portions of the tractor on the respective sides thereof and which connect at their forward ends with a horizontal front wheel mounting plate 26, to the underside of which is connected a front wheel support 27 which journals the front wheel assembly 28 including closely arranged cambered wheels 29 and 30 that are adapted to be steered by means of a lever 31 as later described. The forward portion of the plate 26 is rounded on a radius from substantially the pivotal axis of the front wheel assembly as indicated at 32 and extending therearound and joining with the web portions 36 of the channel-shaped sills 25 is a band 33 which mounts an operator's platform 34 at a level somewhat higher than the upper flanges 37 of the sills. Extending above the operator's platform is an arcuate dash guard 38 cooperating with the rear posts 39 for carrying a hand rail 40 that extends about the sides and front of the operator's station.

The rear edge of the front wheel mounting plate 26 extends transversely and is braced from the lower portion of the radiator assembly 14 by a transverse plate 41 as best shown in Fig. 3. The plate 41 slopes downwardly and rearwardly in covering relation with the front of the radiator so as to prevent the front wheels 29 and 30 from splattering the radiator and provide an air inlet 42 through which cooling air is supplied to the radiator.

The front of the tractor unit is supported from the main sills 25 by a yoke 43 having arms 44 and 45 welded to the main sills and a connecting portion 46 that extends downwardly under the radiator support 15 and secured to the front face of the motor block by fastening devices such as cap screws 47.

Mounted on the plate 26 forwardly of the steering lever 31 is a reduction gearing 48 having a lever 49 which is operatively connected with the lever 31 through a connecting link 50. The reduction gearing is operated by a steering shaft mounted in a substantially vertical steering post 51 carrying a steering wheel 52 that is supported slightly above the hand rail 40.

Pivotally connected with the rear ends of each main sill 25 by means of transverse bolts 53 is a bracket 54. Carried by each bracket 54 is a longitudinal sill 55. The sills 55 register with the main sills 25 and extend from adjacent offsets 56 between the operator's platform and the upper flanges 37 of the main sills 25, to a point rearwardly of the rear axles. The pivoted sills 55 carry a series of transverse girders in the form of angles 56 mounting a floor 57 of a dump body or bed 58. The sides of the dump bed extend over the rear wheels and the front corners cut away on angles as indicated at 59 to conform with the width of the operator's platform as shown in Fig. 4. The dump bed is provided with sides 60 and 61 terminating adjacent the posts 39 in inwardly extending wings 62 and 63. The rear end of the dump body is provided with a swing endgate 64 that is hinged along its upper edge by a rod 65 so that the endgate swings outwardly from the bottom to permit discharge of a load when the dump body is raised as later described.

In order to provide for power operation of the dump body, opposite sides of the transmission housing carry arms 66 which extend rearwardly under the axle housings and mount groove pulleys 67. Operating over the respective pulleys and having ends 68 attached to the rock levers 20 are cables 69 which have their opposite ends anchored with the rearmost transverse girder 56 as indicated at 70.

The clutch lever 18 which effects operation of the pump which supplies a hydraulic fluid to actuate the rock levers 20 is manipulated by a flexible cable 71 that extends forwardly to the operator's platform and connects with a knob 72 carried above a transverse panel 73 which forms a support for the upper end of the steering post and mounts an instrument panel 74.

The hydraulic cylinder supplying the actuating fluid is controlled by a valve (not shown) having a lever 75 that is connected by means of a flexible shaft 76 with an operating knob 77 located on the side of the steering wheel 52 opposite the knob 72. The clutch lever 11 and brake levers 13 are connected with a rock shaft 78 that is mounted in spaced brackets 79 carried on the rear portion of the plate 26 as best shown in Fig. 3, the shaft having arms 80 that are connected with the brake levers 14 by rods 81.

In the form of the invention shown in Fig. 3, the clutch lever is connected to one of the arms 80 by a rod 82. The rock shaft 76 is actuated by a foot lever 83 that is fixed to one of the arms 80 as indicated at 84. The lever 83 has a portion 85 adapted to operate through a slot 86 in the operator's platform and which terminates in a lateral bend to form a foot engaging portion 87.

The gear shifting lever 11 is connected through a ball and socket joint 87 with a link 89 that is connected with a gear shifting lever 90 universally mounted on the plate 26 as indicated at 91 whereby the lever is adapted to move through a H-shaped slot 92 formed in the platform in the manner of a customary gear shifting lever.

The endgate is retained in closed position by latches 93 that are pivotally mounted on a cross shaft 94 carried between the bed supporting sills 55 and in position with the head 95 of the latches engaging back of the endgate as shown in Fig. 5. One of the latches has a depending arm 96 that is connected by a rod 97 with an actuating lever 98, pivotally mounted at the forward end of the platform adjacent the operator's station. The latches are normally retained in latching position by a coil spring 99 having one end engaged with the arm 96 and the opposite end secured to a sill 55. The dump body is latched in load carrying position by means of a latch 100 that is pivotally mounted as at 101 on the side of the operator's platform and in position for a hook 102 thereof to engage over a pin 103 extending laterally from the forward end of one of the sills 55. The latch is released by a foot lever 104 that is attached to the forward edge of the latch and which has a foot engaging portion 105 extending over the upper face of the platform. When the latch is released the weight thereof carries the head of the latch into position to be engaged by the pin 103 whereby the forward portion of the body is supported above the platform to prevent injuring the operator's foot in case it should be extending over the platform. However, if the operator's foot is resting on the foot lever portion 105, the latch is moved from under the pin 103. The latch hook then drops over the pin 103 to retain the dump body and to prevent pivoting thereof on the brackets 24. The body is returned from dumping position by gravity, however, to promote return, the platform is connected with the main sills by means of coil springs 106 and 106'.

When the truck is used for some purposes, it may be desirable to provide a separate control for the latch and brake mechanism (Fig. 7). This is effected by providing a separate foot pedal 107 that is pivotally mounted on the rock shaft and adapted to be connected to the clutch lever. In this form of the invention, both the brake and clutch pedals are provided with transverse tubular foot engaging portions 108 which are adapted to register and to be interconnected by a bolt 109 that is reciprocable in one of the foot engaging portions and which is adapted to move into engagement with the foot engaging portion of the other lever as shown in Fig. 7, the bolt being retained in one or the other of its positions by a pin 110 that is slidable in a slot 111 and which is adapted to engage notches 112 and 113 at the respective ends of the slot.

In operating a service truck constructed as described, the operator stands upon the platform 52 and grasps the steering wheel. In this position the clutch and brake pedal 83 is easily operated by pressing thereon with the foot. This action rocks the shaft 78 to move the arms 80 in a direction to set the brakes for the rear wheels and to release the clutch through pull of the rods 81 and 82 which rock the clutch and brake levers 11 and 13 of the tractor unit. The gear shift lever 98 is manipulated through the various positions in the H slot 92 which shifts the tractor lever 10 through the rod 97 to obtain the desired forward and reverse speeds. Turning of the wheel 52 actuates the lever 49 through the gearing 48 to turn the front wheels on the axis of the front wheel support. The front wheel unit may be turned through substantially 180° so that the truck may make a substantially right or left angle turn with the truck substantially pivoting on the inside rear wheel. The open front of the dump body permits the operator's view of the load and the dumping thereof. To dump a load, the operator steps on the latch lever 104 to rock the hook of the latch 100 out of engagement with the pin 103. The pump clutch lever 18 is actuated by raising the knob 72. The pump actuates piston 19" in the cylinder 19' to actuate the rock levers 20 to pull the cable around the pulleys 67 and causing the dump bed to pivot on the main sills. The endgate latches 93 are released against action of their springs 99 by rocking the lever 98 which is pivotally mounted on one of the sills of the dump bed. The endgate springs open under sliding of the load as the dump bed tips as shown in Fig. 1 and in dotted lines in Fig. 2.

After the load is dumped the other knob 77 is pulled up to operate the valve lever 75 which opens the control valve and allows the fluid to flow out of the hydraulic cylinder. The weight of the forward end of the dump bed supplemented by action of the springs 106 and 106' returns the dump bed to load carrying position. Since the operator's foot is pressing the latch release lever 104, the latch 100 is in position to pass the pin 103 and upon release of the foot pressure, the latch spring returns the hook of the latch in engagement with the pin 103. After the endgate swings closed, release of the endgate operating lever 98 permits the spring 99 to return the endgate latches into latching position.

When two pedals are used as shown in Fig. 7, they may be operated together by sliding the bolt 109 into the clutch pedal with the pin 110 sliding in the slot 111 until it is engaged in the notch 113. The pedals are then locked together to operate the clutch and brakes together similar to the first described foot lever mechanism.

From the foregoing it is obvious that we have provided a service truck having a tripoint mobile support that is readily maneuverable within confined spaces such as the runways and pens of a stock yards. It is also apparent that the truck may be turned practically in its own length and that the dump bed is shaped at the front so as to eliminate protrusions that might interfere with turning of the truck in close places.

The operator is also in a position where the entire expanse of the truck is in view and can easily maneuver the vehicle to avoid fences and other objects by manipulation of the various controls that are immediately at hand.

What we claim and desire to secure by Letters Patent is:

1. A service truck of the character described, a motor and transmission assembly having axle housings extending laterally of the transmission, rocker arms carried by said assembly on opposite sides of the transmission and projecting over the axle housing, a frame including sills having rear ends connected with the axle housings, an operator's platform carried on the forward ends of the sills, steering wheels supporting the front of said frame, a dump bed pivotally connected with the sills near the rear end thereof and extending over the motor and transmission assembly, a pair of pulleys, brackets carrying the pulleys in spaced relation rearwardly of the axle housings, cables operating under said pulleys and having one end connected with the dump bed and their opposite ends connected with said rocker arms to effect pivoting of the dump bed on said frame under actuation of the rocker arms, a latch on the operator's platform for engaging the dump bed to retain the dump bed in load carrying position and adapted to be released by an operator on said platform, and springs connecting the dump bed with the frame for facilitating return of the dump bed to load carrying position after actuation by said rocker arms.

2. A service truck of the character described, a motor and transmission assembly having axle housings extending laterally of the transmission, rocker arms carried by said assembly on opposite sides of the transmission and projecting over the axle housing, a frame including sills having rear ends connected with the axle housings, an operator's platform carried on the forward ends of the sills, closely arranged steering wheels supporting the front of said frame and adapted to turn on a vertical axis to steer said truck, a dump bed extending over the motor and transmission assembly, means for pivotally connecting the dump body with the sills near the rear end thereof, a pair of pulleys, brackets carrying the pulleys in spaced relation rearwardly of the axle housings, cables operating under said pulleys and having one end connected with the dump bed and their opposite ends connected with said rocker arms to effect pivoting of the dump bed on said frame under actuation of the rocker arms, a latch on the operator's platform for engaging the dump bed to retain the dump bed in load carrying position and adapted to be released by an operator on said platform, and springs connecting the dump bed with the frame for facilitating return of the dump bed to load carrying position after actuation by said rocker arms.

3. In a service truck of the character described, a mobile frame including spaced sills carried by the brackets and extending along sides of the motor and transmission assemblies, a substantially horizontal member connecting forward ends of the sills, said plate member having a rounding front portion, a band member extending around said front portion and connected with the sills, a platform carried by the band member, a dash extending around the front of the platform, a rail cooperating with the dash member to provide a guard around the front and side of the platform, and a dump bed mounted on the frame for pivotal movement away from the operator's platform.

4. A service truck including a frame, substantially wide spaced rear wheels at the rear of said frame, a steering wheel unit carrying the front of said frame for providing a substantially tri-point mobile support for said frame, means connecting the front wheel unit with said frame for turning movement on a vertical axis to provide a short turning radius, a power unit forming a part of said frame, an operator's platform carried by the frame directly above said front wheel unit, a dump bed extending over the power unit and having a forward end terminating at the operator's platform, and means pivotally mounting the dump bed on the frame at a point between the rear wheels to tip away from the operator's platform.

5. A service truck including a motor and transmission assembly having axle housings extending laterally of the transmission, rear wheels carried at outer ends of the axle housing, spaced sills extending longitudinally above opposite sides of the motor and transmission assembly and terminating forwardly of the motor, an operator's platform carried by the forward ends of the sills and having a substantially semi-circular forward portion, a steering wheel unit pivotally connected with the operator's platform for supporting the forward ends of the wheels, supporting means between the operator's platform and the motor for supporting the forward end of the motor and transmission assembly by the sills, and a dump body having pivotal support over said sills and extending forwardly over the motor to the operator's platform.

6. A service truck including a motor and transmission assembly having axle housings extending laterally of the transmission, rear wheels carried at outer ends of the axle housing, spaced sills extending longitudinally above opposite sides of the motor and transmission assembly and terminating forwardly of the motor, an operator's platform carried by the forward ends of the sills and having a substantially semi-circular forward portion, a steering wheel unit pivotally connected with the operator's platform for supporting the forward ends of the wheels, supporting means between the operator's platform and the motor for supporting the forward end of the motor and transmission assembly by the sills, and a dump body having pivotal support over said sills and extending forwardly over the motor to the operator's platform, said dump bed having sides projecting beyond the sills and terminating in forwardly converging ends joining with a front wall extending across the rear of the operator's platform.

CARL W. RICKEL.
FRANK EYERLY.

REFERENCES CITED

The following references are of record in the file of this patent:

UNITED STATES PATENTS

| Number | Name | Date |
|---|---|---|
| 1,225,339 | Kuefer | May 8, 1917 |
| 1,373,000 | Gilbert et al. | Mar. 29, 1921 |
| 1,481,763 | Trimmer | Jan. 22, 1924 |
| 1,711,224 | Stockfleth et al. | Apr. 30, 1929 |
| 1,973,107 | Sanders et al. | Sept. 11, 1934 |
| 2,015,911 | Schroeder | Oct. 1, 1935 |
| 2,222,086 | Moore et al. | Nov. 19, 1940 |
| 2,255,758 | Call | Sept. 16, 1941 |
| 2,533,549 | Bell | Dec. 12, 1950 |

FOREIGN PATENTS

| Number | Country | Date |
|---|---|---|
| 853,549 | France | Nov. 28, 1939 |